(No Model.)

C. WEHNER.
CLUTCH.

No. 360,262. Patented Mar. 29, 1887.

Witnesses:
Theodore L. Popp
Geo. J. Buchheit Jr.

C. Wehner Inventor
By Wilhelm Wehner
Attorneys

UNITED STATES PATENT OFFICE.

CHRISTIAN WEHNER, OF BUFFALO, NEW YORK, ASSIGNOR OF ONE-HALF TO JOHN SPIESS, SR., OF SAME PLACE.

CLUTCH.

SPECIFICATION forming part of Letters Patent No. 360,262, dated March 29, 1887.

Application filed November 29, 1886. Serial No. 220,107. (No model.)

*To all whom it may concern:*

Be it known that I, CHRISTIAN WEHNER, of the city of Buffalo, in the county of Erie and State of New York, have invented new and useful Improvements in Clutch Mechanisms, of which the following is a specification.

This invention relates to an improvement in that class of clutch mechanisms which are employed for converting reciprocating or oscillating motion into rotary motion, and which consists of a hub having on its face cam-shaped recesses, a ring surrounding the hub, and friction-rollers interposed between the cams of the hub and the surrounding ring. Heretofore the faces of the friction-rollers and of the cams have been made straight or plain transversely, which renders the rollers liable to slip, thereby causing a certain amount of lost motion.

The object of my invention is to construct the friction-rollers in such manner as to insure a more perfect contact of the rollers with the hub and the surrounding ring.

The invention consists of the improvement, which will be hereinafter described, and pointed out in the claims.

Figure 1:
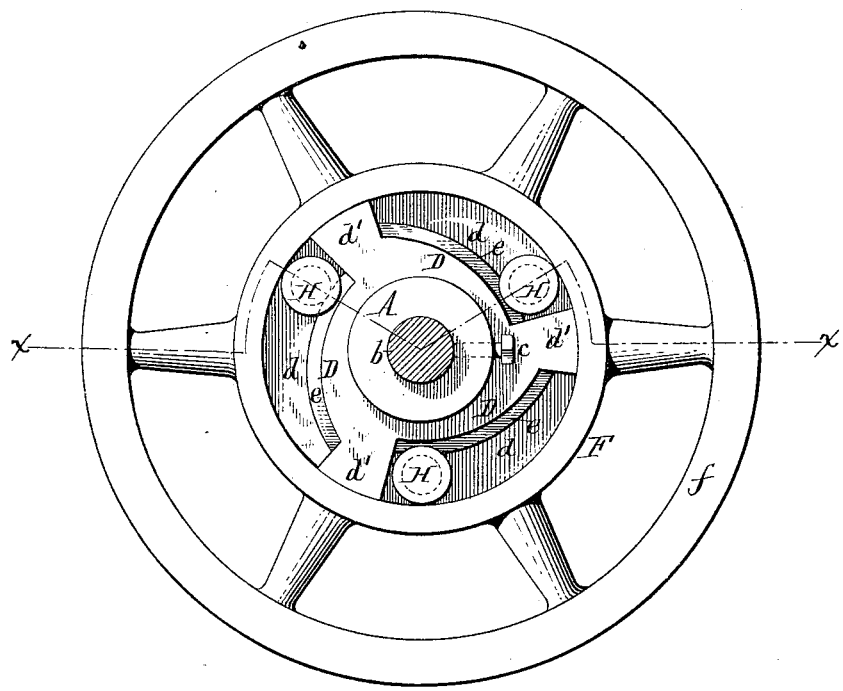
Figure 2:
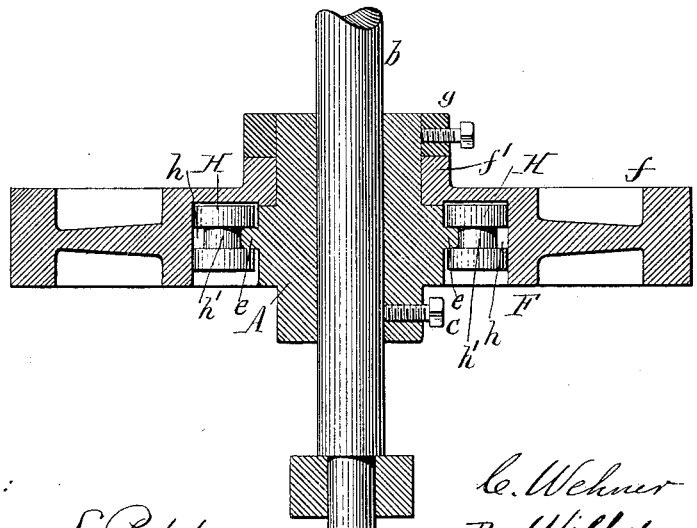

In the accompanying drawings, Figure 1 is a side elevation of my improved clutch. Fig. 2 is a horizontal section thereof in line $x\,x$, Fig. 1.

Like letters of reference refer to like parts in both figures.

A represents the hub, which is mounted on a shaft or arbor, $b$. The hub may be fastened to the shaft $b$ by a set-screw, $c$, as shown; or, if desired, the hub may turn loosely on the shaft. The hub A is provided with recesses $d$, which are formed in the face of the hub at equal distances apart, and are separated by the intervening projecting portions $d'$. The hub A is provided in its recesses with cams or eccentric portions D, each of which is provided on its face with a central rib or feather, $e$, extending lengthwise over each cam.

F represents the ring which surrounds the hub A, and which is provided with a wheel or pulley, $f$. The ring F is mounted loosely on the hub A by means of a collar, $f'$, which turns freely thereon, while the ring F turns loosely on the projections $d'$ of the hub. The ring F is held on the hub A by a collar, $g$.

H represent the friction-rollers, which are arranged in the recesses $d$ of the hub, between the cams D and the ring F. The rollers H are each provided with an annular groove, $h$, and a central contracted neck, $h'$, of less diameter than the diameter of the rollers, and which is of the proper width to receive the rib $e$. The rollers H bear against the cams D only with the contracted central necks, $h'$, and the sides of the grooves $h$, while they bear against the surrounding ring F with their face portions on both sides of the groove $h$, as clearly represented in the drawings. The ribs $e$ act as fulcrums for the rollers and enable the rollers to adjust themselves to any wear or inequality of the parts and to take a firm hold on the cams, thus insuring a reliable contact of the rollers and cams in all circumstances and preventing slipping of the rollers.

My improved clutch mechanism may be employed for operating the driving-wheels of velocipedes, the blowers of forges, and for various other purposes in which reciprocating or oscillating motion is to be converted into rotary motion.

I claim as my invention—

1. The combination, with the hub A, provided with cam-shaped ribs $e$, of a ring, F, surrounding the hub, and friction-rollers H, arranged between the hub and the ring, and provided with grooves $h$, which engage over the ribs $e$, substantially as set forth.

2. The combination, with the hub A, provided on its face with recesses $d$, separated by projections $d'$, and cam-shaped ribs $e$, formed on the hub in the recesses $d$, of a ring, F, surrounding the hub, and friction-rollers H, arranged in the recesses $d$, and provided with grooves $h$, which engage over the ribs $e$, substantially as set forth.

Witness my hand this 11th day of November, 1886.

CHRISTIAN WEHNER.

Witnesses:
CARL F. GEYER,
JNO. J. BONNER.